(12) United States Patent
Richardson et al.

(10) Patent No.: US 8,734,164 B2
(45) Date of Patent: May 27, 2014

(54) CURRENT CONTROL BRUSH ASSEMBLY HAVING AXIAL AND RADIAL FILAMENTS

(75) Inventors: Jason Richardson, Hebron, ME (US); Matthew D. Roman, Rockport, ME (US); Jeffrey W. Richardson, Otisfield, ME (US); Adam Willwerth, Yarmouth, ME (US)

(73) Assignee: Illinois Tool Works Inc., Glenview, IL (US)

( * ) Notice: Subject to any disclaimer, the term of this patent is extended or adjusted under 35 U.S.C. 154(b) by 4 days.

(21) Appl. No.: 13/482,827

(22) Filed: May 29, 2012

(65) Prior Publication Data
US 2013/0005158 A1    Jan. 3, 2013

Related U.S. Application Data

(60) Provisional application No. 61/502,217, filed on Jun. 28, 2011.

(51) Int. Cl.
*H01R 39/00* (2006.01)
*H05F 3/00* (2006.01)

(52) U.S. Cl.
USPC ............................................. 439/27; 361/221

(58) Field of Classification Search
USPC ................ 439/27–28; 361/220–224; 310/309
See application file for complete search history.

(56) References Cited

U.S. PATENT DOCUMENTS

| | | | | |
|---|---|---|---|---|
| 5,661,356 A * | 8/1997 | Fisher et al. | | 310/219 |
| 5,804,903 A * | 9/1998 | Fisher et al. | | 310/248 |
| 7,193,836 B2 * | 3/2007 | Oh et al. | | 361/220 |
| 7,521,827 B2 * | 4/2009 | Orlowski et al. | | 310/68 R |
| 8,169,766 B2 * | 5/2012 | Oh et al. | | 361/221 |
| 8,189,317 B2 * | 5/2012 | Oh et al. | | 361/221 |
| 8,199,453 B2 * | 6/2012 | Oh et al. | | 361/221 |
| 2008/0258576 A1 | 10/2008 | Oh et al. | | |
| 2013/0106236 A1 * | 5/2013 | Roman et al. | | 310/239 |

FOREIGN PATENT DOCUMENTS

| | | |
|---|---|---|
| EP | 0796663 A2 | 9/1997 |
| JP | 2000102219 A | 4/2000 |

OTHER PUBLICATIONS

International Search Report from PCT application No. PCT/US2012/044170 dated Jan. 23, 2013, 12 pgs.

* cited by examiner

*Primary Examiner* — Chandrika Prasad
(74) *Attorney, Agent, or Firm* — Fletcher Yoder P.C.

(57) ABSTRACT

A system, in certain embodiments, includes a current control brush assembly including an axial button having a first electrically conductive housing retaining a first set of electrically conductive filaments. The first set of electrically conductive filaments extends generally inward along an axial direction. The current control brush assembly also includes a radial shaft grounding ring (SGR) coupled to the axial button. The radial SGR includes a second electrically conductive housing retaining a second set of electrically conductive filaments. The second set of electrically conductive filaments is arranged circumferentially around the second electrically conductive housing, and the second set of electrically conductive filaments extends generally inward along a radial direction.

13 Claims, 4 Drawing Sheets

US 8,734,164 B2

CURRENT CONTROL BRUSH ASSEMBLY HAVING AXIAL AND RADIAL FILAMENTS

CROSS REFERENCE TO RELATED APPLICATION

This application claims priority from and the benefit of U.S. Provisional Application Ser. No. 61/502,217, entitled "CURRENT CONTROL BRUSH ASSEMBLY", filed Jun. 28, 2011, which is hereby incorporated by reference in its entirety.

BACKGROUND

The invention relates generally to a current control brush assembly and, more specifically, to a brush assembly having axial and radial filaments configured to contact a rotating shaft.

During operation of an electric motor, a static electrical charge may accumulate on the motor drive shaft due to friction between the rotating shaft and the surrounding air. In addition, friction between rotating objects electrically coupled to the shaft and the surrounding air may further increase the static electrical charge on the shaft. Moreover, in certain embodiments, the electric motor is driven by a variable frequency drive that may generate elevated common mode voltages. As a result, an electrical charge may be induced within the shaft, thereby further increasing the accumulated charge. If the shaft electrical charge exceeds a threshold value, the shaft may discharge to the motor housing, thereby increasing wear on motor elements (e.g., bearings, windings, etc.) and/or interfering with operation of objects coupled to the shaft.

BRIEF DESCRIPTION

A system, in certain embodiments, includes a current control brush assembly including an axial button having a first electrically conductive housing retaining a first set of electrically conductive filaments. The first set of electrically conductive filaments extends generally inward along an axial direction. The current control brush assembly also includes a radial shaft grounding ring (SGR) coupled to the axial button. The radial SGR includes a second electrically conductive housing retaining a second set of electrically conductive filaments. The second set of electrically conductive filaments is arranged circumferentially around the second electrically conductive housing, and the second set of electrically conductive filaments extends generally inward along a radial direction.

DRAWINGS

These and other features, aspects, and advantages of the present invention will become better understood when the following detailed description is read with reference to the accompanying drawings in which like characters represent like parts throughout the drawings, wherein.

DETAILED DESCRIPTION

Figure 1:
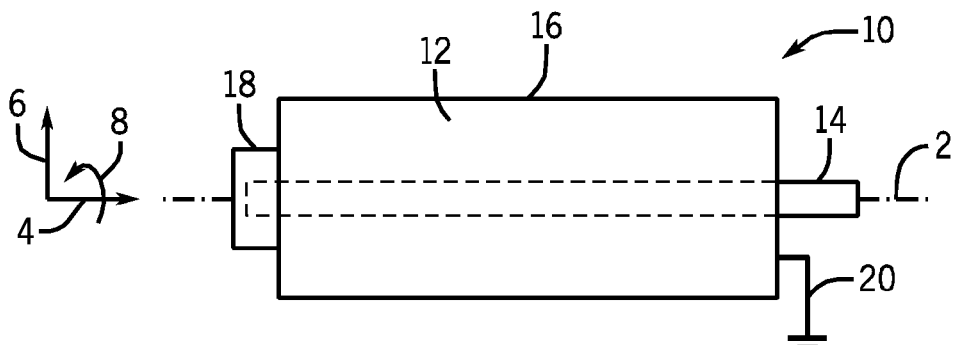
FIG. 1 is a schematic diagram of an exemplary electrical motor system including an embodiment of a current control brush assembly.

One or more specific embodiments of the present invention will be described below. In an effort to provide a concise description of these embodiments, all features of an actual implementation may not be described in the specification. It should be appreciated that in the development of any such actual implementation, as in any engineering or design project, numerous implementation-specific decisions must be made to achieve the developers' specific goals, such as compliance with system-related and business-related constraints, which may vary from one implementation to another. Moreover, it should be appreciated that such a development effort might be complex and time consuming, but would nevertheless be a routine undertaking of design, fabrication, and manufacture for those of ordinary skill having the benefit of this disclosure.

When introducing elements of various embodiments of the present invention, the articles "a," "an," "the," and "said" are intended to mean that there are one or more of the elements. The terms "comprising," "including," and "having" are intended to be inclusive and mean that there may be additional elements other than the listed elements. Any examples of operating parameters and/or environmental conditions are not exclusive of other parameters/conditions of the disclosed embodiments.

Embodiments of the present disclosure may substantially reduce accumulation of an electrical charge on a shaft by providing a current control brush assembly having multiple electrically conductive filaments configured to contact the shaft, and to transfer the electrical charge from the shaft to an electrically conductive housing. In certain embodiments, the current control brush assembly includes an axial button having an electrically conductive cylindrical housing, and a first set of electrically conductive filaments retained by the electrically conductive cylindrical housing. The first set of electrically conductive filaments extends generally inward along an axial direction. The current control brush assembly also includes a radial shaft grounding ring (SGR) coupled to the axial button. The radial SGR includes an electrically conductive annular housing, and a second set of electrically conductive filaments retained by the electrically conductive annular housing. The second set of electrically conductive filaments is arranged circumferentially around the electrically conductive annular housing, and extends generally inward along a radial direction. When the current control brush assembly is coupled to an electric motor housing, the first set of filaments will contact an axial end of the motor drive shaft, and the second set of filaments will contact the outer circumference of the shaft. As a result, a larger number of filaments will contact the shaft in both axial and radial directions, as compared to configurations that include only axial filaments or only radial filaments. Consequently, an increased electrical connection between the shaft and the motor housing will be provided, thereby reducing the possibility of an electrical discharge between the shaft and the housing.

FIG. 1 is a schematic diagram of an exemplary electrical motor system 10 including an embodiment of a current control brush assembly. As illustrated, an electric motor 12 includes a shaft 14 and an electrically conductive housing 16.

As will be appreciated, electrical power may be applied to the motor 12, thereby generating electromagnetic fields that induce the shaft 14 to rotate relative to the housing 16. During operation of the electric motor 12, a static electrical charge may accumulate on the shaft 14 due to friction between the shaft (and/or equipment coupled to the shaft) and the surrounding air. Consequently, the illustrated embodiment includes a current control brush assembly 18 configured to transfer an electrical charge from the shaft 14 to the electrically conductive housing 16. Because the electrically conductive housing 16 is electrically coupled to a reference potential (e.g., the Earth ground 20), the electrical charge induced by rotation of the shaft 14 will be dissipated prior to substantial accumulation. As a result, the possibility of an electrical discharge between the shaft 14 and the housing 16 will be substantially reduced or eliminated.

As discussed in detail below, the current control brush assembly 18 is configured to increase the number and directions of filament contact with the shaft 14. For purposes of discussion reference will be made to a rotational axis 2 of the shaft 14, an axial direction or axis 4 along the shaft 14, a radial direction or axis 6 toward or away from the shaft 14, and a circumferential direction or axis 8 around the shaft 14. In certain embodiments, the current control brush assembly 18 includes an axial button having an electrically conductive cylindrical housing, and a first set of electrically conductive filaments extending axially 4 inward toward the shaft 14. The current control brush assembly also includes a radial shaft grounding ring (SGR) coupled to the axial button. The radial SGR includes an electrically conductive annular housing, and a second set of electrically conductive filaments arranged circumferentially 8 around the electrically conductive annular housing and extending radially 6 inward toward the shaft 14. The first set of filaments will contact an axial end of the shaft 14, and the second set of filaments will contact the outer circumference of the shaft 14. As a result, a larger number of filaments will contact the shaft 14, as compared to configurations that include only axial 4 filaments or only radial 6 filaments. Consequently, an increased electrical connection between the shaft 14 and the housing 16 will be provided, thereby reducing the possibility of an electrical discharge between the shaft 14 and the housing 16. In addition, the current control brush assembly 18 is configured to seal against a surface of the housing 16 to substantially block external contaminants from entering the interior of the electric motor 12.

Figure 2:
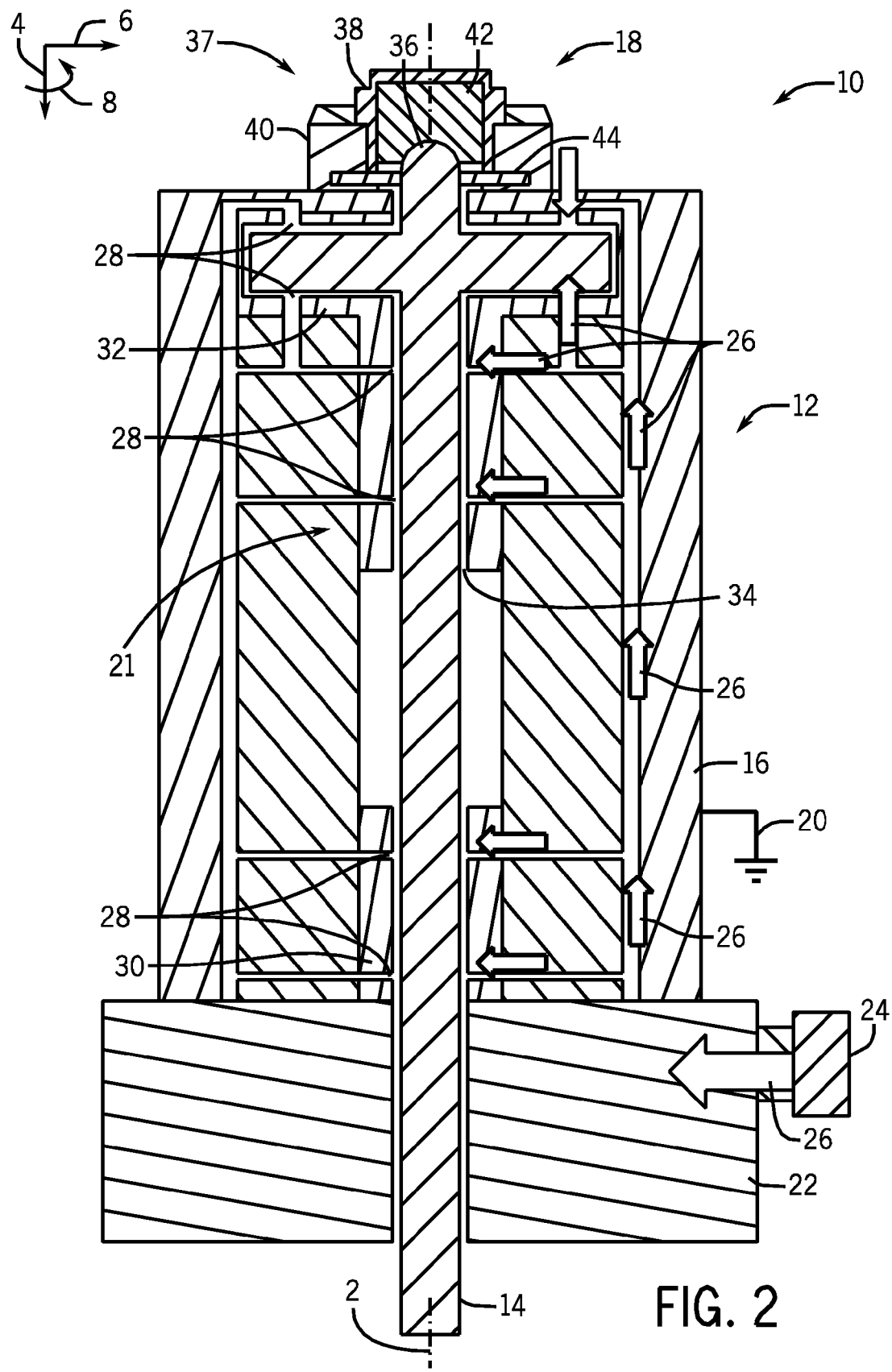
FIG. 2 is a cross-sectional view of the electrical motor system of FIG. 1, including an embodiment of a current control brush assembly having electrically conductive filaments configured to transfer an electrical charge from a shaft to an electrically conductive housing of the electrical motor system.

FIG. 2 is a cross-sectional view of the electrical motor system 10 of FIG. 1, including an embodiment of a current control brush assembly 18 having electrically conductive filaments configured to transfer an electrical charge from the shaft 14 to the electrically conductive housing 16 of the electric motor 12. In the illustrated embodiment, the electrical motor system 10 includes a fluid bearing assembly 21 configured to provide a thin film of fluid around the shaft 14. The thin film of fluid reduces rotational resistance of the shaft 14, thereby facilitating high-speed shaft 14 rotation. As illustrated, the electrical motor system 10 includes an end cap 22 having a port 24 configured to receive a fluid flow 26. As will be appreciated, the fluid flow 26 may include any suitable fluid configured to reduce rotation resistance of the shaft 14, such as air, water or oil, among others.

The fluid entering the port 24 is directed toward the shaft 14 via a series of passages 28. In the illustrated embodiment, the electrical motor system 10 includes a journal bearing 30 and a thrust/journal bearing 32. The bearings 30 and 32 include passages configured to direct the fluid flow 26 toward the shaft 14, thereby providing a fluid gap 34 between the shaft 14 and the bearings 30 and 32. In addition, the bearings 30 and 32 are configured to block axial 4 and radial 6 movement of the shaft 14 relative to the housing 16, while enabling the shaft 14 to rotate at high speeds.

In the illustrated embodiment, the shaft 14 includes a nub 36 (e.g., axial protrusion) that extends through the housing 16 and into the current control brush assembly 18. The current control brush assembly 18 includes multiple electrically conductive filaments configured to contact the nub 36 to facilitate transfer of an electrical charge from the shaft 14 to an electrically conductive housing 37 of the current control brush assembly 18. As illustrated, the brush assembly housing 37 is electrically coupled to the motor housing 16 and the motor housing 16 is electrically coupled to the Earth ground 20, such that an electrical path is established between the electrically conductive filaments and the ground 20. Consequently, an induced electrical charge on the shaft 14 transfers to the ground 20 via the electrically conductive filaments. As a result, an electrical charge induced by rotation of the shaft 14 dissipates prior to substantial accumulation, thereby substantially reducing or eliminating the possibility of an electrical discharge between the shaft 14 and the housing 16.

In the illustrated embodiment, the current control brush assembly 18 includes an axial button 38 and a radial shaft grounding ring (SGR) 40. As discussed in detail below, the axial button 38 is coupled to the radial SGR 40, thereby providing a unitary assembly that surrounds the nub 36. As illustrated, the axial button 38 includes a first set of electrically conductive filaments 42 extending generally inward along the axial direction 4. In addition, the radial SGR 40 includes a second set of electrically conductive filaments 44 extending generally inward along the radial direction 6. In the present embodiment, the second set of filaments 44 is distributed about the shaft 14 along the circumferential direction 8. In this configuration, the first set of filaments 42 contacts an axial end of the nub 36, and the second set of filaments 44 contacts the outer circumference of the nub 36. As a result, a larger number of filaments will contact the nub 36 in multiple directions (e.g., axial 4 and radial 6), as compared to configurations that include only axial filaments or only radial filaments. Consequently, an increased electrical connection between the shaft 14 and the housing 16 will be provided, thereby reducing the possibility of an electrical discharge between the shaft 14 and the housing 16.

Figure 3:
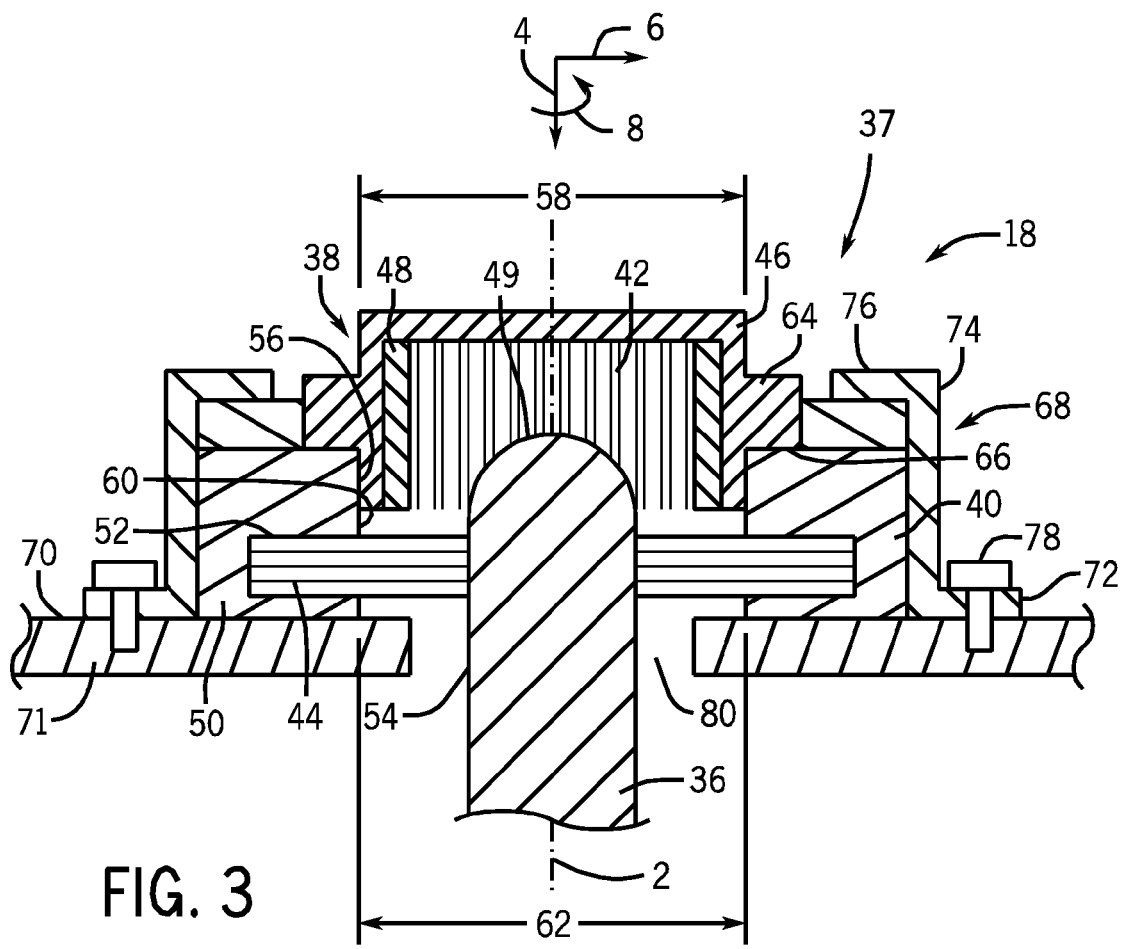
FIG. 3 is a detailed cross-sectional view of the current control brush assembly of FIG. 2.

FIG. 3 is a detailed cross-sectional view of the current control brush assembly 18 of FIG. 2. As illustrated, the axial button 38 includes an electrically conductive cylindrical housing 46 configured to retain the first set of electrically conductive filaments 42. The cylindrical housing 46 is formed from a conductive material, such as aluminum, copper, brass, or steel, among others. In the illustrated embodiment, a retaining tube 48 is employed to couple the filaments to the housing. Specifically, the first set of electrically conductive filaments 42 is compressed within the retaining tube 48 (e.g., via placing filaments within the tube 48, and crimping a portion of the tube 48 to reduce the tube diameter). The retaining tube 48 is then press fit into the electrically conductive cylindrical housing 46. As a result, a connection is established between the first set of filaments 42 and the electrically conductive cylindrical housing 46 that substantially reduces or eliminates the possibility of filament detachment. While a retaining tube 48 is employed in the illustrated embodiment, it should be appreciated that other filament retaining features may be utilized in alternative embodiments. For example, certain embodiments may employ a conductive adhesive to secure the filaments to the housing. Alternatively, the filaments may be directly compressed by the interior surface of the housing 46, thereby securing the filaments to the housing.

In the illustrated embodiment, the retaining tube 48 is formed from an electrically conductive material, such as copper, to facilitate transfer of an electrical charge from the filaments 42 to the housing 46. Consequently, contact between the first set of filaments 42 and an axial end 49 of the nub 36 will establish an electrical connection between the shaft 14 and the housing 46. As illustrated, the cylindrical housing 46 is electrically coupled to the motor housing 16 and the motor housing 16 is electrically coupled to the Earth ground 20, such that an electrical path is established between the shaft 14 and the ground 20. As a result, an electrical charge induced by rotation of the shaft 14 will be dissipated prior to substantial accumulation, thereby substantially reducing or eliminating the possibility of an electrical discharge between the shaft 14 and the housing 16.

Furthermore, the radial SGR 40 includes an electrically conductive annular housing 50 configured to retain the second set of electrically conductive filaments 44. The annular housing 50 is formed from a conductive material, such as aluminum, copper, brass, or steel, among others. In the illustrated embodiment, the annular housing 50 includes a series of cavities 52 configured to capture the filaments, and to provide an electrical connection between the filaments and the housing 50. In certain embodiments, the second set of electrically conductive filaments 44 is secured to the annular housing 50 by a conductive adhesive. Alternatively, the filaments may be retained within the cavities 52 via compression of the filaments between elements (e.g., annular plates) of the annular housing 50. Because the filaments are electrically coupled to the housing 50, contact between the second set of filaments 44 and a circumference 54 of the nub 36 will establish an electrical connection between the shaft 14 and the housing 50. As illustrated, the annular housing 50 is electrically coupled to the motor housing 16 and the motor housing 16 is electrically coupled to the Earth ground 20, such that an electrical path is established between the shaft 14 and the ground 20. As a result, an electrical charge induced by rotation of the shaft 14 will be dissipated prior to substantial accumulation, thereby substantially reducing or eliminating the possibility of an electrical discharge between the shaft 14 and the housing 16.

In the illustrated embodiment, the electrically conductive cylindrical housing 46 is press fit into the electrically conductive annular housing 50 to couple the axial button 38 to the radial SGR 40. As illustrated, the cylindrical housing 46 includes an outer circumferential surface 56 having a first diameter 58, and the annular housing 50 includes an inner circumferential surface 60 having a second diameter 62. As illustrated, the first diameter 58 is substantially equal to the second diameter 62, such that contact between the outer circumferential surface 56 of the cylindrical housing 46 and the inner circumferential surface 60 of the annular housing 50 creates a press fit or interference fit to couple the axial button 38 to the radial SGR 40. While a press fit connection is employed in the illustrated embodiment, it should be appreciated that alternative embodiments may utilize a conductive adhesive and/or fasteners to secure the axial button 38 to the radial SGR 40.

As illustrated, the electrically conductive cylindrical housing 46 includes an alignment feature 64 extending outwardly from the cylindrical housing 46 along the radial direction 6. The alignment feature 64 is configured to align the electrically conductive cylindrical housing 46 with the electrically conductive annular housing 50 along the axial direction 4. Specifically, contact between the alignment feature 64 and an upper axial surface 66 of the annular housing 50 blocks axial 4 movement of the axial button 38 relative to the radial SGR 40. As a result, the first set of electrically conductive filaments 42 are positioned such that the ends of the filaments 42 contact the axial end 49 of the nub 36. In addition, contact between the alignment feature 64 and the upper axial surface 66, and contact between the outer circumferential surface 56 and the inner circumferential surface 60 establishes an electrical connection between the axial button 38 and the radial SGR 40. Consequently, an electrical charge received by the axial button 38 transfers to the housing 16, and then to the Earth ground 20, via the radial SGR 40.

In the illustrated embodiment, the current control brush assembly 18 is secured to the electric motor 12 via clamps 68 configured to mount the electrically conductive annular housing 50 to a surface 70 of an electrically conductive faceplate 71 of the motor housing 16. As illustrated, each clamp 68 includes a base 72 configured to mount to the surface 70 of the electrically conductive faceplate, a riser 74 projecting outwardly from the base 70 along an outer radial surface of the annular housing 50 (i.e., in the axial direction 4), and a distal end 76 projecting outwardly from the riser 74 along an axial end surface of the annular housing 50 (i.e., in the radial direction 6). Fasteners 78 extending through the base 72 secure the clamps 68 to the surface 70 of the faceplate 71. Consequently, movement of the annular housing 50 is blocked by contact with the surface 70 of the faceplate 71, and with the distal ends 76 of the clamps 68. In addition, the surface 70 of the faceplate 71 is electrically conductive, such that an electrical connection is established between the annular housing 50 and the motor housing 16, thereby providing an electrical path between the second set of filaments 44 and the Earth ground 20. In alternative embodiments, the clamps 68 may be configured to mount the electrically conductive annular housing 50 to a surface of an alternative electrically conductive faceplate, such as a faceplate of a motor shroud. In such embodiments, the alternative faceplate is electrically coupled to a reference potential (e.g., the Earth ground), thereby providing an electrical path between the current control brush assembly 18 and the ground.

While the illustrated embodiment employs clamps 68 to secure the current control brush assembly 18 to the surface 70 of the faceplate 71, it should be appreciated that alternative embodiments may employ other coupling features. For example, in certain embodiments, an electrically conductive adhesive layer may be applied between the annular housing 50 and the surface 70 of the faceplate. Alternatively, the circumference of the annular housing 50 may be extended outwardly in the radial direction 6, thereby providing sufficient area to accommodate fasteners. In such embodiments, the fasteners may extend through the housing 50 and into the faceplate 71, thereby securing the housing 50 to the faceplate 71. In further embodiments, the annular housing 50 may be press fit into an opening in the motor housing 16, thereby securing the current control brush assembly 18 to the electric motor 12.

In certain embodiments, each filament 42 and 44 is a fine, hair-like structure (e.g., micro conductive fiber) made from carbon fiber, stainless steel, conductive plastics such as acrylic or nylon fibers, or any other conductive fiber-type filament. In addition, each filament has a diameter less than about 150 microns. For example, certain filaments have a diameter within a range of about 5 microns to about 100 microns. Due to the flexibility of the micro conductive fibers, the filaments will generally maintain contact with the shaft 14 during high-speed shaft rotation. In addition, contact between the micro conductive fibers and the shaft produces less rotational resistance than larger diameter/stiffer fibers. It should be appreciated, that the length, diameter and material of each filament 42 and 44 may be particularly selected to effectively transfer an electrical charge from the shaft 14 to the brush assembly housing 37, while facilitating shaft rotation. For example, in certain embodiments, the diameter of each filament 42 in the first set may be greater than the diameter of each filament 44 in the second set. In addition, the length of each filament 42 in the first set may be selected to effectively accommodate the geometry of the axial end 49 of the nub 36.

As previously discussed, the first set of filaments 42 contacts the axial end 49 of the nub 36, and the second set of filaments 44 contacts the outer circumference 54 of the nub 36. As a result, a larger number of filaments will contact the nub 36 in multiple directions (e.g., axial 4 and radial 6), as compared to configurations that include only axial filaments or only radial filaments. Consequently, an increased electrical connection between the shaft 14 and the housing 16 will be provided, thereby reducing the possibility of an electrical discharge between the shaft 14 and the housing 16.

In the illustrated embodiment, the current control brush assembly 18 is configured to seal against the surface 70 of the electrically conductive faceplate 71 to substantially block external contaminants from passing through the electrically conductive faceplate 71. As previously discussed, the cylindrical housing 46 may be press fit into the annular housing 50, and the annular housing 50 may be secured to the surface 70 of the faceplate via the clamps 68. Consequently, an opening 80 in the faceplate configured to facilitate passage of the shaft 14 is substantially sealed. As a result, the current control brush assembly 18 substantially blocks particles (e.g., dust, dirt, metallic particles, or other contaminants) from entering the interior of the electric motor 12.

Figure 4:
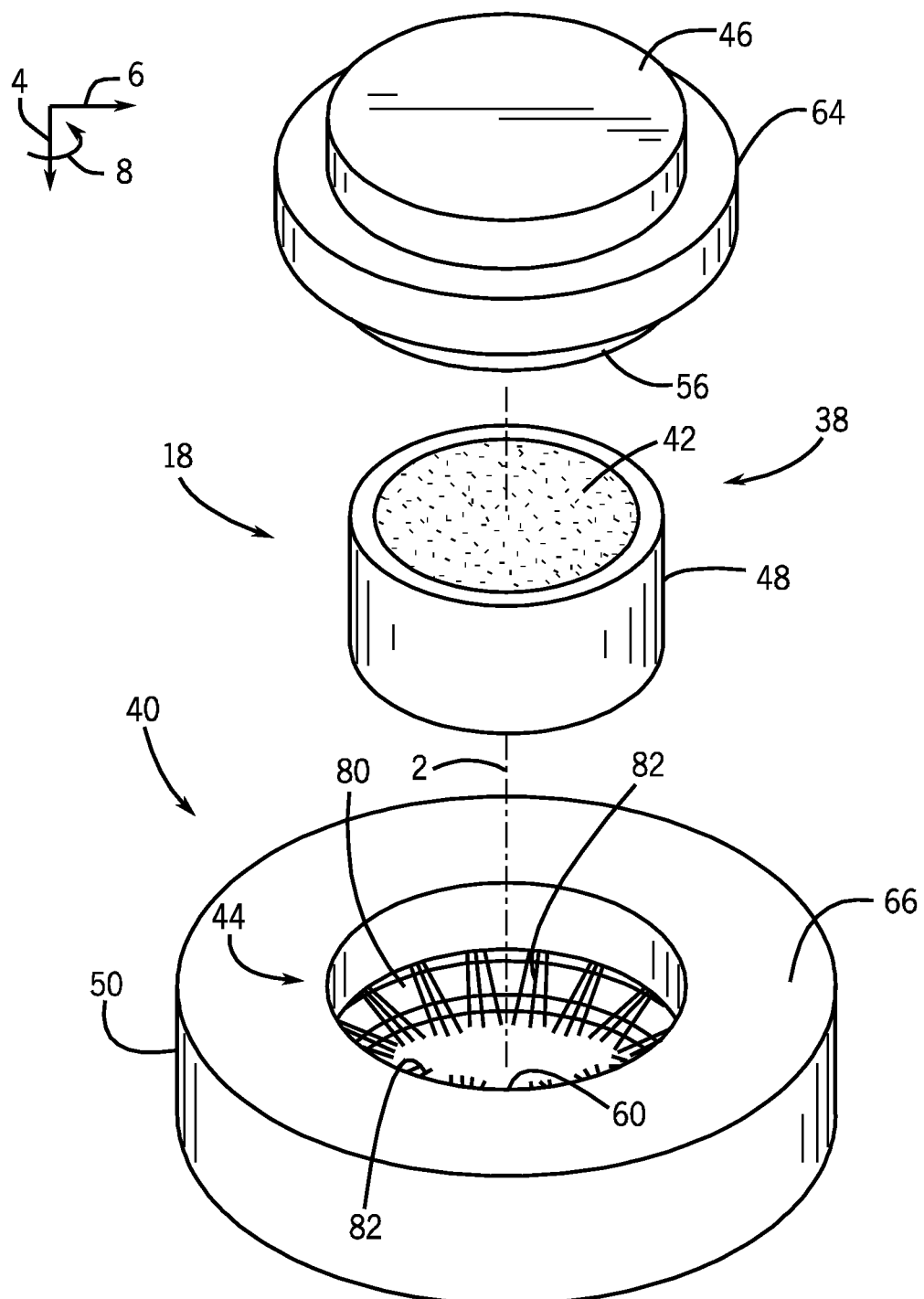
FIG. 4 is an exploded view of the current control brush assembly of FIG. 2.

FIG. 4 is an exploded view of the current control brush assembly 18 of FIG. 2. As illustrated, the first set of electrically conductive filaments 42 is compressed within the retaining tube 48, thereby securing the filaments to the tube 48 and establishing an electrical connection between the filaments and the electrically conductive tube 48. To secure the first set of filaments 42 to the cylindrical housing 46, the retaining tube 48 is press fit into the electrically conductive cylindrical housing 46. As a result, a connection is established between the first set of filaments 42 and the electrically conductive cylindrical housing 46 that substantially reduces or eliminates the possibility of filament detachment.

Furthermore, the second set of electrically conductive filaments 44 is retained by the annular housing 50. As illustrated, the second set of filaments 44 is arranged circumferentially around the electrically conductive annular housing (i.e., along the circumferential direction 8), and extends generally inward along the radial direction 6. In the illustrated embodiment, the second set of filaments 44 is arranged in bundles or groups 82 separated from one another in the circumferential direction 8. As will be appreciated, the number of filaments in each group 82, and the number of groups 82 may be particularly selected to provide the desired electrical contact between the shaft 14 and the radial SGR 40. While the illustrated embodiment includes eight groups 82 of filaments, it should be appreciated that alternative embodiments may include more or fewer groups 82. For example, certain embodiments may include 2, 4, 6, 8, 10, 12, or more groups 82 of filaments. In alternative embodiments, the filaments may be continuously distributed about the circumference of the annular housing 50.

As previously discussed, the electrically conductive cylindrical housing 46 is press fit into the electrically conductive annular housing 50 to couple the axial button 38 to the radial SGR 40. Specifically, contact between the outer circumferential surface 56 of the cylindrical housing 46 and the inner circumferential surface 60 of the annular housing 50 secures the axial button 38 to the radial SGR 40, thereby forming a unitary structure. While a cylindrical housing 46 and an annular housing 50 are employed in the illustrated embodiment, it should be appreciated that alternative embodiments may include housings having other shapes/configurations. For example, in certain embodiments, the axial button may include a housing having a substantially square cross-section configured to interlock with a substantially square opening in the radial SGR housing.

Figure 5:
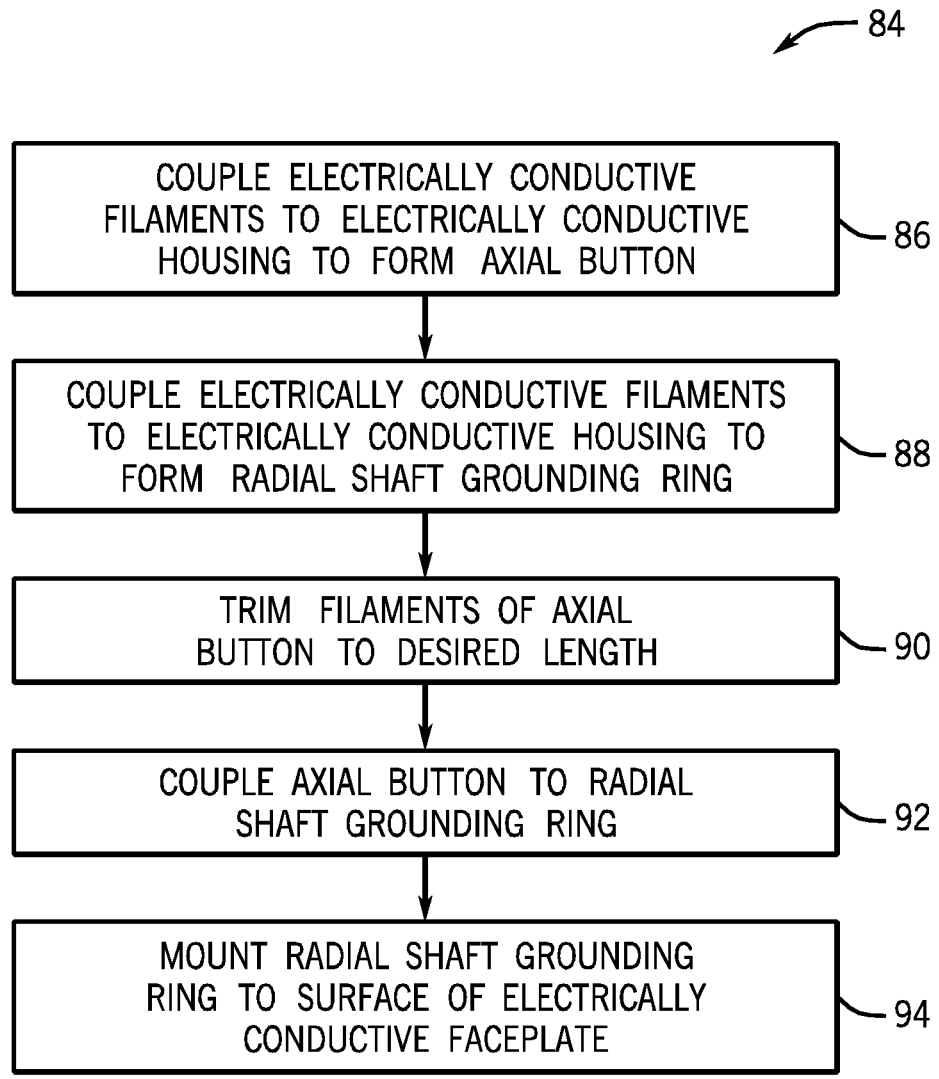
FIG. 5 is a flow diagram of an embodiment of a method of manufacturing a current control brush assembly.

FIG. 5 is a flow diagram of an embodiment of a method 84 of manufacturing a current control brush assembly. First, as represented by block 86, electrically conductive filaments are coupled to an electrically conductive housing to form an axial button. For example, the electrically conductive filaments may be compressed within a retaining tube, and the retaining tube may be press fit into the electrically conductive housing to secure the filaments to the housing. Next, as represented by block 88, electrically conductive filaments are coupled to an electrically conductive housing to form a radial SGR. For example, the electrically conductive filaments may be adhesively coupled to cavities within the radial SGR housing. The filaments of the axial button are then trimmed to a desired length, as represented by block 90. In certain embodiments, the electrically conductive filaments may be trimmed such that the ends of the filaments contact an axial end of a shaft nub. The axial button is then coupled to the radial SGR, as represented by block 92, to form a complete current control brush assembly. For example, the axial button housing may be press fit into the radial SGR housing to couple the axial button to the radial SGR. Finally, as represented by block 94, the radial SGR is mounted to a surface of an electrically conductive faceplate. In certain embodiments, clamps may be employed to secure the radial SGR housing to a surface of an electrically conductive faceplate of a motor housing.

While only certain features of the invention have been illustrated and described herein, many modifications and changes will occur to those skilled in the art. It is, therefore, to be understood that the appended claims are intended to cover all such modifications and changes as fall within the true spirit of the invention.

The invention claimed is:

1. A system comprising:
   a current control brush assembly, comprising:
      an axial button comprising a first electrically conductive housing retaining a first plurality of electrically conductive filaments, wherein the first plurality of electrically conductive filaments extends generally inward along an axial direction; and
      a radial shaft grounding ring (SGR) coupled to the axial button, wherein the radial SGR comprises a second electrically conductive housing retaining a second plurality of electrically conductive filaments, wherein the second plurality of electrically conductive filaments is arranged circumferentially around the second electrically conductive housing, and the second plurality of electrically conductive filaments extends generally inward along a radial direction;
      wherein the first and second electrically conductive housings directly contact one another to form a unitary assembly, the second electrically conductive housing is configured to mount to a surface of an electrically conductive faceplate, and at least a portion of the first and second pluralities of electrically conductive filaments is configured to contact an axial protrusion of a shaft extending through the electrically conductive faceplate into an interior of the unitary assembly.

2. The system of claim 1, wherein the first electrically conductive housing is substantially cylindrical, and the second electrically conductive housing is substantially annular.

3. The system of claim 2, wherein an outer diameter of the first electrically conductive housing is substantially equal to an inner diameter of the second electrically conductive housing, and the first electrically conductive housing is press fit into the second electrically conductive housing to couple the radial SGR to the axial button.

4. The system of claim 1, wherein the first plurality of electrically conductive filaments extends axially inward toward the axial protrusion of the shaft, the first plurality of electrically conductive filaments is configured to transfer a first electrical charge from the shaft to the first electrically conductive housing, the second plurality of electrically conductive filaments extends radially inward toward the axial protrusion of the shaft, and the second plurality of electrically conductive filaments is configured to transfer a second electrical charge from the shaft to the second electrically conductive housing.

5. The system of claim 1, wherein the current control brush assembly is configured to seal against the surface of the electrically conductive faceplate to substantially block external contaminants from passing through the electrically conductive faceplate.

6. The system of claim 1, comprising a clamp configured to mount the second electrically conductive housing to the surface of the electrically conductive faceplate, wherein the clamp comprises a base configured to mount to the surface of the electrically conductive faceplate, a riser projecting outwardly from the base along an outer radial surface of the second electrically conductive housing, and a distal end projecting outwardly from the riser along an axial surface of the second electrically conductive housing.

7. The system of claim 1, comprising an electric motor having a housing comprising the electrically conductive faceplate.

8. A system comprising:
a current control brush assembly, comprising:
an axial button comprising an electrically conductive cylindrical housing retaining a first plurality of electrically conductive filaments, wherein the first plurality of electrically conductive filaments extends generally inward along an axial direction; and
a radial shaft grounding ring (SGR) coupled to the axial button, wherein the radial SGR comprises an electrically conductive annular housing retaining a second plurality of electrically conductive filaments, wherein the second plurality of electrically conductive filaments is arranged circumferentially around the electrically conductive annular housing, and the second plurality of electrically conductive filaments extends generally inward along a radial direction;
wherein an outer diameter of the electrically conductive cylindrical housing is substantially equal to an inner diameter of the electrically conductive annular housing, and the electrically conductive cylindrical housing is press fit into the electrically conductive annular housing to couple the radial SGR to the axial button.

9. The system of claim 8, wherein the first plurality of electrically conductive filaments extends axially inward toward a shaft, the first plurality of electrically conductive filaments is configured to transfer a first electrical charge from the shaft to the electrically conductive cylindrical housing, the second plurality of electrically conductive filaments extends radially inward toward the shaft, and the second plurality of electrically conductive filaments is configured to transfer a second electrical charge from the shaft to the electrically conductive annular housing.

10. The system of claim 8, wherein the first plurality of electrically conductive filaments is compressed within a retaining tube, and the retaining tube is press fit into the electrically conductive cylindrical housing.

11. The system of claim 8, wherein the electrically conductive cylindrical housing comprises an alignment feature extending radially outward from the electrically conductive cylindrical housing, wherein the alignment feature is configured to axially align the electrically conductive cylindrical housing with the electrically conductive annular housing via contact between the alignment feature and an upper axial surface of the electrically conductive annular housing.

12. The system of claim 8, wherein the electrically conductive cylindrical housing and the electrically conductive annular housing are formed from a material comprising aluminum.

13. The system of claim 8, wherein at least one of the first plurality of electrically conductive filaments is made from a material comprising micro conductive fiber, and at least one of the second plurality of electrically conductive filaments is made from a material comprising micro conductive fiber.

* * * * *